United States Patent Office 3,367,031
Patented Feb. 6, 1968

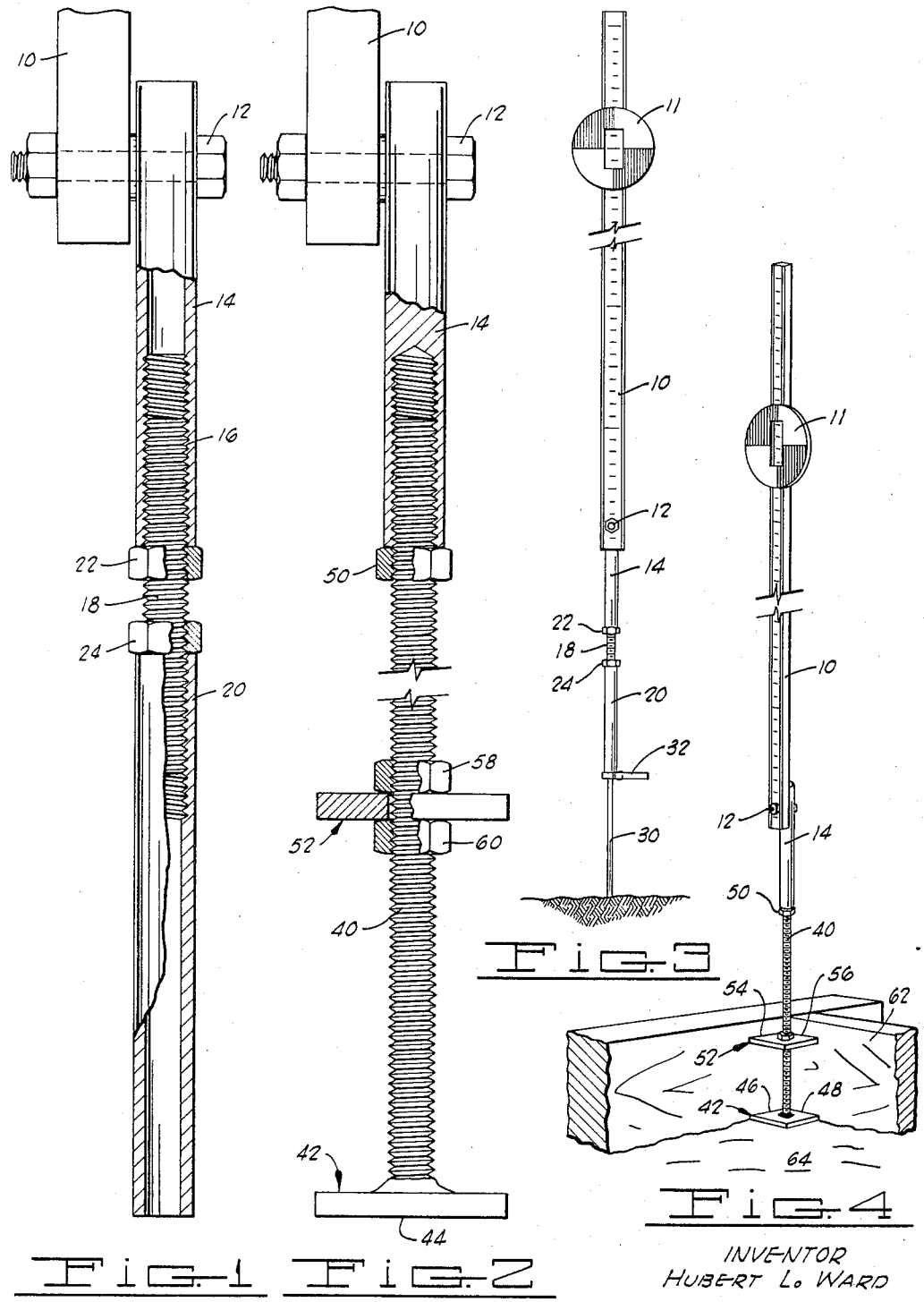

3,367,031
DEVICE FOR ESTABLISHING
REFERENCE LEVELS
Hubert L. Ward, 2326 "C" Court, Enid, Okla. 73108
Filed Mar. 4, 1966, Ser. No. 531,727
10 Claims. (Cl. 33—74)

ABSTRACT OF THE DISCLOSURE

A device for establishing reference levels in construction work and including a rigid, elongated rod having scale indicia thereon and a target slidably mounted on the rod. A tubular member is pivotally connected to the rod near one of its ends, and is provided with threads at its end not connected ot the rod to permit either of two types of grade leveling devices to be detachably connected to the tubular member. Each of these grade leveling devices include threaded bars which threadedly engage the tubular member and extend in axial alignment therewith, and also carry other threads to which two different structures may be secured. One of these is a hollow tube and spacing nuts which space the hollow tube from the tubular member. The other are a pair of rectangular plates, and spacing nuts which space one of these plates from the tubular member.

---

This invention relates to a device for establishing horizontal reference levels, and more particularly, but not by way of limitation, to a carpenter's device for establishing the horizontal level of the top of a footing structure, or of a stem wall, or of both these structures. The measuring or surveying devices presently available to carpenters for the purpose of laying or establishing the horizontal level which is to characterize the footing of a building, and the upper surface of the stem wall thereof, are tedious to utilize and frequently, because of the necessity to manipulate them several times during the sighting and leveling operations, yield erroneous readings, and therefore footing and stem wall surfaces constructed from these measurements are not perfectly horizontal from one end thereof to the other.

The present invention provides an improved measuring apparatus for establishing, when used in conjunction with a surveyor's transit, a perfectly horizontal reference level to be used in the construction of footings for buildings and the like. The device can also be used with slight modification of its structure to establish the horizontal level of building stem walls, all measurements and reference marks being established and located in a way which assures the alignment of the surfaces to be constructed in a perfectly horizontal plane, and without distortion at any point between corners of the building.

Broadly described, the present invention comprises a rigid, elongated rod, a target slidably mounted on the rod, and an elongated tubular member having a first end and a second end which is pivotally connected to one end of the rod for pivotation about a pivotal axis lying in a plane extending normal to the axis and rod. At its end which is not connected to the elongated rod, the tubular member has means, such as internal threads, for detachably connecting a grade level indicating structure to the tubular member. The basic structure as thus broadly described can be usefully employed in establishing horizontal reference levels by its use in conjunction with a standard surveyor's transit. In its most useful form, however, the apparatus of the invention further includes, in addition to the structure thus broadly described, either of two grade level indicating structures which are detachably connected to the elongated tubular member and are employed in alternate sequence during the construction of buildings.

The more simple and more economically constructed of the two grade level indicating structures adapted for detachable connection to the tubular member of the basic device is an elongated bar having, in a preferred embodiment, threads on the opposite ends thereof so that one of its ends can be threaded into an internal thread on the elongated tubular member of the basic structure. The other end of the bar is threaded into a second tubular member which is substantially longer than the first-mentioned tubular member of the basic structure. When the device thus described is assembled, the second tubular member can be telescoped over stakes which have been driven into the ground along the path or course over which a building footing is to be constructed. The initial reference marker for the horizontal level of the footing is then marked off on one of the stakes and made to coincide with the lower end of the second tubular member while it is telescoped over the stake. The target is then adjusted on the elongated, rigid rod of the instrument to be aligned with the cross-hairs of a surveyor's transit which is conveniently positioned for establishing reference marks upon all other stakes driven along the line where the footing is to be laid. Then, by maintaining the target at a fixed location on the elongated rigid rod following the establishment of the first reference level, the target can be sighted in by the transit as the reference level-establishing device is moved along the course of the footing, and the lower end of the second tubular member is positioned over each stake. When the target is thus sighted in, the lower end of the second tubular member will terminate at a point on the respective stake which is at precisely the same horizontal level as the initially established reference mark on the first stake.

From the foregoing description of the invention, it will have become apparent that a major object of the invention is to provide an improved device for establishing reference levels, which device can be utilized with a minimum of manipulation, and which requires little technical training in its use.

Another object of the invention is to provide a device for establishing reference levels, which device can be economically constructed, and which is characterized by a long and trouble-free operating life.

An additional object of the invention is to provide a device for establishing reference levels which can be especially usefully employed in construction operations for determining the grade level of a building footing, and the height and level of a building stem wall in construction operations.

An additional object of the invention is to provide for establishing reference levels, which device can be folded into a relatively compact configuration for transport or storage.

An additional object of the invention is to provide a device for establishing reference levels, which device can be used with versatility to establish a grade line or reference level along a plurality of stakes already placed in the ground, or can be utilized to establish a grade line or reference level on a stem wall form already in place.

In addition to the foregoing described objects and advantages, additional objects and advantages will become apparent as the following detailed description is read in conjunction with the accompanying drawings which illustrate the invention.

In the drawings:

FIGURE 1 is a view partly in section and partly in elevation of the lower portion of one embodiment of the reference level establishing device of the invention.

FIGURE 2 is a view similar to FIGURE 1, but illustrating a different arrangement of structural elements in the reference level establishing device of the invention.

FIGURE 3 is a view in elevation of the reference level establishing device of the invention as it is being used to establish a reference level for laying a footing for a building.

FIGURE 4 is a view in elevation similar to FIGURE 3, but illustrating the reference level establishing device of the invention as it is being used to determine the height to which concrete is to be poured in a stem wall form preparatory to constructing the stem wall of a building.

Referring now to the drawings in detail, and particularly, to FIGURE 1, reference numeral 10 designates a stadia rod or similar elongated rigid rod having graduations thereon for measuring off a length of the rod. A target 11 is sildably mounted on the stadia rod as shown in FIGURES 3 and 4. Pivotally secured to the lower end of the stadia rod 10 by means of a bolt 12 is an elongated tubular member 14 which is provided at its lower end with internal threads 16.

In the illustrated embodiment of the invention, an elongated externally threaded bar 18 has its upper end threaded into the lower end of the tubular member 14, and its lower end threaded into the upper end of a second elongated tubular member 20. It will be observed that the second elongated tubular member 20 is considerably longer than the tubular member 14, and is coaxially aligned with the tubular member 14. A pair of locknuts 22 and 24 are provided on the threaded bar 18 and are used to maintain the relative position of the bar 18 to the tubular members 14 and 20 after it has been threaded into each of these members.

The embodiment of the invention as thus described can be conveniently utilized for establishing the horizontal level which is to characterize a building footing, and its use for this purpose is illustrated in FIGURE 3. Let it be assumed initially that the locations of the corners of a building have been determined, and that stakes 30 have been driven into the ground at the points where the corners of the footing are to be located. The stakes 30 each extend vertically and are provided adjacent their upper ends with a clothespin 32 or other member which can be quickly snapped onto the stakes, but which frictionally engages the stake for vertical sliding movement thereon.

When the stakes 30 and clothespins 32 have thus been located, the reference level establishing device of the invention is utilized in the manner shown in FIGURE 3. Thus, the lower end of the tubular member 20 is slipped over the top of the stake, and the stadia rod 10 is then rotated to a position such that the target 11 slidably mounted thereon faces toward a surveyor's transit placed at a sutiable location for sighting at a horizontal level across each of the footing corner locations. A distance is then measured upwardly along the stake 30 from the ground to the *point* on the stake where the top of the footing is to be located. The clothespin 32 is moved to this location, and the lower end of the tubular member 20 is brought to bear lightly against the clothespin.

The target 11 is then adjusted on the stadia rod 10 until it is aligned with the cross-hairs of the transit. It will be noted that, by this means, a fixed distance between the reference line of the target 11 and the lower end of the tubular member 20 is established. After establishing this fixed distance, the reference level establishing device can be moved on to the other three or more stakes used to establish the corners of the building footing. By sliding the lower tubular member 20 over each of the stakes 30 to force the clothespin 32 downwardly thereon until a point is reached at which the reference line on the target 11 is aligned with the cross-hairs of the transit, precisely the same vertical level is established for each of the clothespins 32 on each of the stakes 30. The points thus located on the stakes 30 by the clothespins 32 can then be interconnected by a taut string or cord, and the reference horizontal level which is to characterize the top of the completed footing is thus established.

By slight modification of its structure, the reference level establishing device of the invention can be utilized to establish a desired horizontal reference level on a wooden stem wall form so as to indicate the level to which the concrete is to be poured in the form. For this operation, the reference level establishing device is modified structurally to the arrangement shown in FIGURE 2. In this arrangement, an elongated threaded bar 40 is threadedly engaged with the internal threads of the tubular member 14 and carries at its opposite end a base plate 42 which has a flat lower surface 44 and two side edges 46 and 48 which intersect at a right angle. Preferably, the base plate 42 is square.

A nut 50 is provided on the upper portion of the threaded bar 40 for fixing its position relaitve to the tubular member 14. Intermediate the length of the threaded bar 40 is a reference plate 52 which is sildably mounted on the threaded bar 40 and which has two sides 54 and 56 which intersect in a right angle and lie in two common planes with the sides 46 and 48 of the base plate 42, such planes extending parallel to the aligned axes of bar 40 and tubular member 14. A pair of locknuts 58 and 60 are provided for fixing the position of the plate 52 on the bar 40.

In the use of the device for establishing a reference level on a stem wall form 62, the base plate 42 is placed on the ground 64 in the corner of the form as shown in FIGURE 4. The sides 46 and 48 of the base plate 42, and the sides 54 and 56 of the reference plate 52 are abutted against the converging sides of the form 62 so that the stadia rod 10 extends upwardly in a substantially vertical line. The reference plate 52 is adjusted in its vertical position on the threaded bar 40 to position it at the desired height on the stem wall form 62 where the upper surface of the concrete to be poured into the form is to reach. A nail is then driven into the form 62 at the exact level of the reference plate 52. The target 11 is then adjusted to bring its reference line into alignment with the cross-hairs of the transit. In this way, a fixed reference distance is established between the target reference line and the reference plate 52. The reference level establishing device is then moved into each of the corners of the stem wall form 62, and by bringing the reference line of the target 11 into alignment with the cross-hairs of the transit, the reference plate 52 will be positioned at the desired vertical height on the stem wall form. Nails are driven in each corner of the form 62 and a chalk string is extended between the nails. In this way, a precisely horizonal reference level is established on the stem wall form 62 which assures that the top of the stem wall when poured will be precisely horizontal and located at the exact height within the form that is desired.

From the foregoing description of the invention, it will be apparent that the present invention provides an improved reference level establishing device for locating quickly and easily, and with a minimum of manipulation of the device, the reference level which is to characterize a building footing or a stem wall. The device can be economically constructed, and is versatile in its possibilities of use.

Although a specific embodiment of the invention has been herein illustrated in order to provide an example of its construction, it will be apparent that many modifications and innovations can be effected in the structure without departure from the basic principles which underlie the invention. Insofar as such modifications are made while continuing to rely on the basic principles of the invention, they are deemed to be circumscribed by the spirit and scope of the invention except as the same may be necessarily limited by the appended claims or reasonable equivalents thereof.

I claim:

1. A device for establishing a horizontal level comprising:
   a rigid, elongated rod;
   a target slidably mounted on said rod;

an elongated, tubular member having a threaded first end, and having a second end pivotally connected to one end of said elongated rod for pivotation about a pivotal axis lying in a plane extending normal to the axis of the rod whereby said tubular member may be extended from the rod in one position and folded into parallelism with the rod in a second position;

a bar threadedly engaging at one of its ends the first end of said tubular member, and having external threads over at least a portion of the remainder of its length; and spacing nuts threaded on said bar and threadable axially therealong for adjusting the spacing from said tubular member of an alignment and guiding element.

2. A device for establishing a horizontal level comprising:

a rigid, elongated rod;

a target slidably mounted on said rod;

an elongated tubular member having a first end, and having a second end pivotally connected to one end of said elongated rod for pivotation about a pivotal axis lying in a plane extending normal to the axis of said rod; and means on the first end of said tubular member for detachably connecting a grade level indicating device to said tubular member and further characterized to include a grade level indicating device connected to the connecting means on the first end of said tubular member.

wherein said grade level indicating device comprises:

a bar positioned in coplanar alignment with said tubular member and said elongated rigid rod, and having at least one of its ends threaded and threadedly engaging said tubular member; and vertical alignment and guide means mounted for adjustable longitudinal movement on said bar and having two converging straight side edges intersecting in a right angle for bearing against a stem wall form and indicating a grade level thereon.

3. A device as claimed in claim 2 wherein said grade level indicating device further includes a base plate secured to the opposite end of said bar from its end threadedly engaging said tubular member for supporting said horizontal level establishing device on the ground.

4. A device as defined in claim 2 wherein said vertical alignment and guide means is a flat plate occupying a plane extending normal to the axis of said bar.

5. A device as claimed in claim 3 wherein said base plate is characterized in having two converging straight side edges intersecting in a right angle and aligned with the two side edges of said vertical alignment and guide means in two planes extending parallel to the axis of said bar.

6. A device as claimed in claim 2 and further characterized to include means for adjustably fixing the position of said vertical alignment and guide means on said bar.

7. A device as claimed in claim 5 wherein said vertical alignment and guide means and said base plate are both square plates.

8. A device as claimed in claim 7 wherein said elongated rigid rod is further characterized in having linear measurement indicia extending over at least a portion of its length.

9. A device as claimed in claim 8 and further characterized to include means for adjustably fixing the position of said vertical alignment and guide means on said bar.

10. A device for establishing a horizontal level comprising:

a rigid, elongated rod;

a target slidably mounted on said rod;

an elongated, tubular member having a first end, and having a second end pivotally connected to one end of said elongated rod for pivotation about a pivotal axis lying in a plane extending normal to the axis of said rod; and a bar having first and second threaded ends, and having one end threaded into said first end of said tubular member;

a second tubular member threadedly telescoped over the second end of said bar; and means on said bar limiting the movement of said bar into said first mentioned tubular member, and limiting movement of said second tubular member over the second end of said bar.

References Cited

UNITED STATES PATENTS

| 1,010,007 | 11/1911 | Adams | 33—74 |
| 1,165,820 | 12/1915 | Watson | 33—74 |
| 2,224,273 | 12/1940 | Neptune | 33—74 |
| 3,230,626 | 1/1960 | Berrien | 33—74 |

FOREIGN PATENTS

| 21,887 | 1898 | Great Britain. |

HARRY N. HAROIAN, *Primary Examiner.*